Oct. 12, 1965 H. M. DODGE 3,210,806
APPARATUS FOR MOLDING ONE-PIECE RUBBER GIRDLES
Original Filed Feb. 2, 1959 4 Sheets-Sheet 1

INVENTOR
Howard M. Dodge
BY McCoy, Greene + Le Grotenhuis
ATTORNEYS

Oct. 12, 1965   H. M. DODGE   3,210,806
APPARATUS FOR MOLDING ONE-PIECE RUBBER GIRDLES
Original Filed Feb. 2, 1959   4 Sheets-Sheet 3

INVENTOR
Howard M. Dodge
BY Melog, Greene + Le Grotenleni
ATTORNEYS

Oct. 12, 1965  H. M. DODGE  3,210,806
APPARATUS FOR MOLDING ONE-PIECE RUBBER GIRDLES
Original Filed Feb. 2, 1959  4 Sheets-Sheet 4
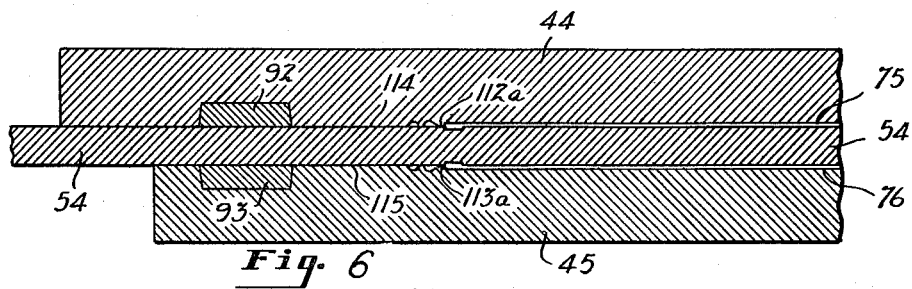
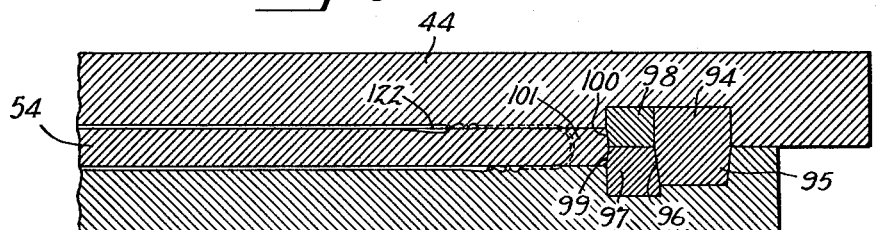
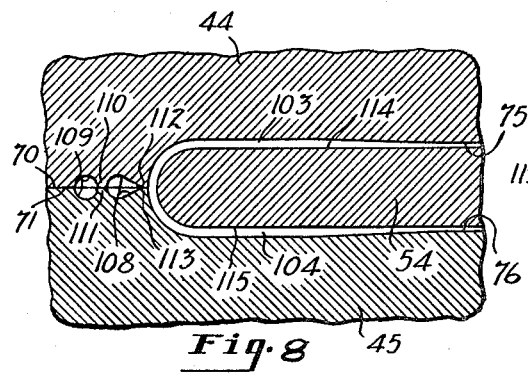
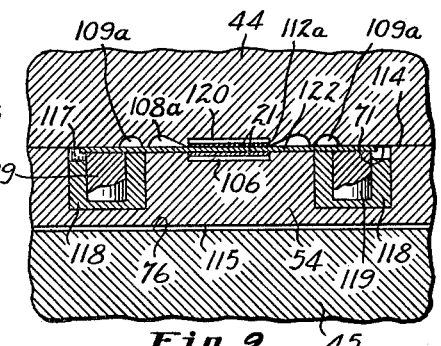
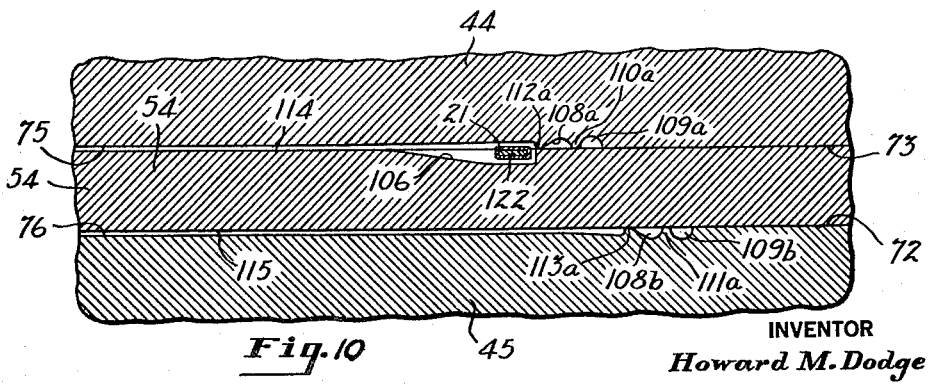
INVENTOR
*Howard M. Dodge*
BY *McCoy, Greene & Te Grotenhuis*
ATTORNEYS United States Patent Office 3,210,806
Patented Oct. 12, 1965

3,210,806
APPARATUS FOR MOLDING ONE-PIECE RUBBER GIRDLES
Howard M. Dodge, Marion, Ind., assignor to The General Tire & Rubber Company, Akron, Ohio, a corporation of Ohio
Original application Feb. 2, 1959, Ser. No. 790,472, now Patent No. 3,075,532, dated Jan. 29, 1963. Divided and this application June 20, 1962, Ser. No. 203,831
1 Claim. (Cl. 18—35)

This application is a division of my copending application Serial No. 790,472, filed February 2, 1959, now Patent No. 3,075,532.

The present invention relates to an apparatus for molding a one-piece rubber girdle.

The apparatus of the present invention provides an inexpensive molded rubber pantie girdle or other girdle which is more comfortable and convenient to use, which provides much better shaping of the body, and which is more attractive and more durable than previously known rubber garments. Because of its low cost, its extremely high quality and its unusual advantages, the girdle made by the apparatus of the present invention greatly increases the market for rubber garments. The invention is of a pioneer nature, and reverses a trend of thinking in the field of rubber garments which has persisted for two decades because it represents such a giant stride forward in the girdle art.

The rubber girdle made by the apparatus of the present invention functions much better than previously known garments. The parts of the girdle contacting the stomach or abdomen and the buttocks are thickened so as to shape the body properly, and the parts at the upper sides of the girdle are thickened to provide reinforcing areas including finger-shaped portions which support the body in an ideal manner. The garter tabs and the portions of the girdle above the tabs are shaped so that the tension on the tabs stretches the main wall of the girdle and applies forces to the body which eliminate unsightly bulges. Since the molding operation permits the formation of gradual tapers and any desired change in thickness at different portions of the girdle, the girdle may be shaped to stretch at the right places and to apply pressure to the desired portions of the body without increasing the cost of manufacture. The result is an improvement in the functioning, the durability and the comfort of the rubber girdle.

The outside surface of the girdle is provided with a fine design which remains attractive after the girdle is used many times, the molding operation permitting the use of fine detail because of the ability to reproduce the details almost exactly as they are provided on the mold surface.

The present invention provides an apparatus for making rubber girdles which improves the quality of molded rubber articles and greatly reduces the cost of making rubber girdles. The apparatus permits the formation of the article in a single molding operation without the necessity for trimming of unsightly fins and provides a more durable article which is free of ragged edges or scissors cuts which are apt to start tears in the rubber. The mold is provided with two excess passages and is shaped so as to pinch off the rubber cleanly throughout the margins of the waist and leg openings and at the opposite sides of the girdle. The ridges formed by pinching off the rubber are very small and tend to reinforce the garment because they have a uniform cross section throughout their length.

An object of the invention is to provide an apparatus for making a high quality one-piece rubber girdle at minimum cost in a single molding operation.

Another object of the invention is to obtain better control of the flow of rubber in a high pressure rubber mold.

Other objects, uses and advantages of the present invention will become apparent to those skilled in the art from the following description and claims and from the drawings in which:

FIGURE 6 is a fragmentary vertical sectional view taken on the line 6—6 of FIGURE 4;

FIGURE 7 is a fragmentary vertical sectional view taken on the line 7—7 of FIGURE 4;

FIGURE 8 is a vertical sectional view taken on the line 8—8 of FIGURE 4;

FIGURE 9 is a fragmentary vertical sectional view taken on the line 9—9 of FIGURE 4 and on the same scale as FIGURES 5 to 8; and FIGURE 10 is a fragmentary vertical sectional view of the empty mold similar to FIGURE 7 and on a larger scale taken on the line 10—10 of FIGURE 4;

Figure 1:
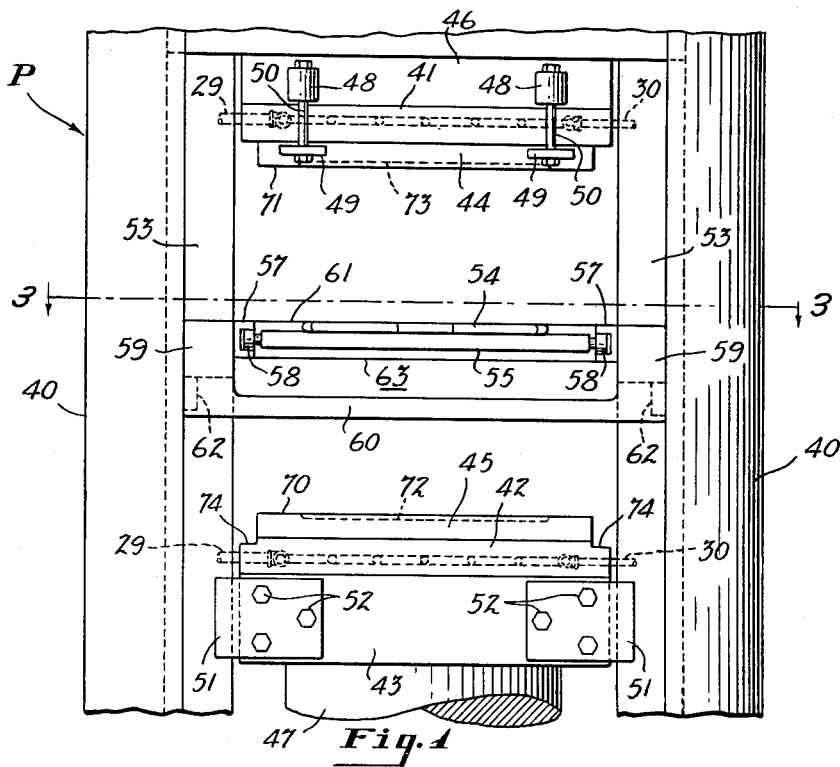
FIGURE 1 is a front elevational view on a reduced scale with parts omitted showing a molding press constructed according to the present invention and adapted to make the girdle shown in FIGURES 1 to 11 of Patent No. 3,075,532, the parts being shown in their positions when the ram is in a retracted position.

Referring more particularly to the drawings in which like parts are identified by the same numerals throughout the several views, FIGURES 1 to 10 show an apparatus constructed to facilitate low cost manufacture of the girdle shown in FIGURES 1 to 11 of Patent No. 3,075,532 in a single operation without the necessity for trimming or assembling the girdle. This apparatus includes a rigid metal frame having a pair of vertical standards 40 and an upper frame portion 46 which supports the top platen 41. The bottom platen 42 of the press is rigidly mounted on a ram cap 43 and is adapted to move with the ram cap toward and away from the top platen. The top and bottom platens are heated by steam which is supplied thereto by inlet pipes 29 and exhausted therefrom by outlet pipes 30.

A horizontal top mold section 44 is mounted in a fixed position on the top platen, and a similar bottom mold section 45 is rigidly mounted on the bottom platen 42 for vertical movement therewith. The mold section 45 and the platen 42 are rigidly connected to the ram 47. The mold section 44 and the top platen 41 are rigidly connected to the frame portion 46 in fixed positions by ears 49, bosses 48 and bolts 50 as will be apparent from FIG. 1. The bosses 48 are integral with the frame portion 46, and the ears 49 are integral with the top mold section 44. Four guide plates 51 are rigidly connected to the four corners of the rectangular ram cap 43 by bolts 52. The plates 51 slidably engage the standards 40 as the ram 47 moves vertically to guide the upper end portion of the ram.

Figure 2:
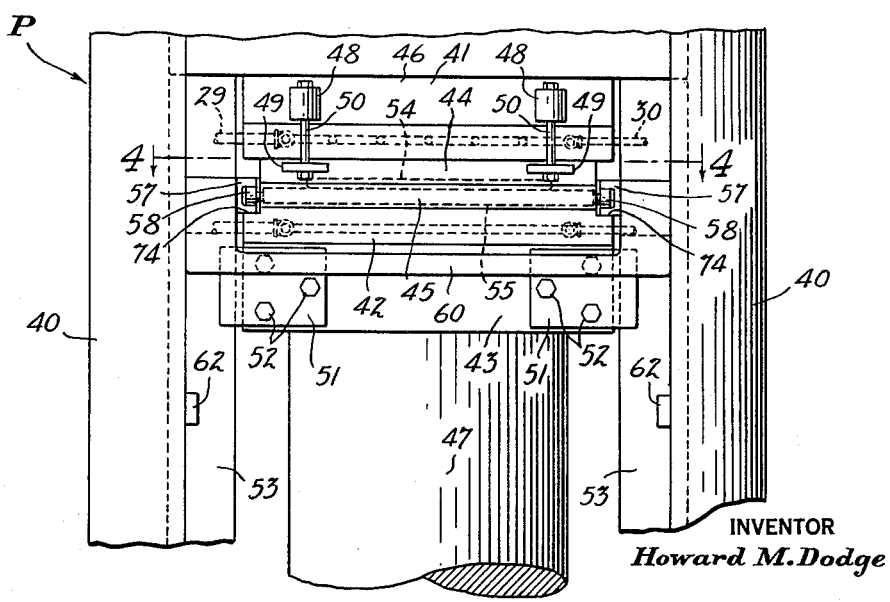
FIGURE 2 is an elevational view similar to FIGURE 1 and on the same scale showing the press with the parts thereof in their positions when the ram is in its uppermost position.
Figure 3:
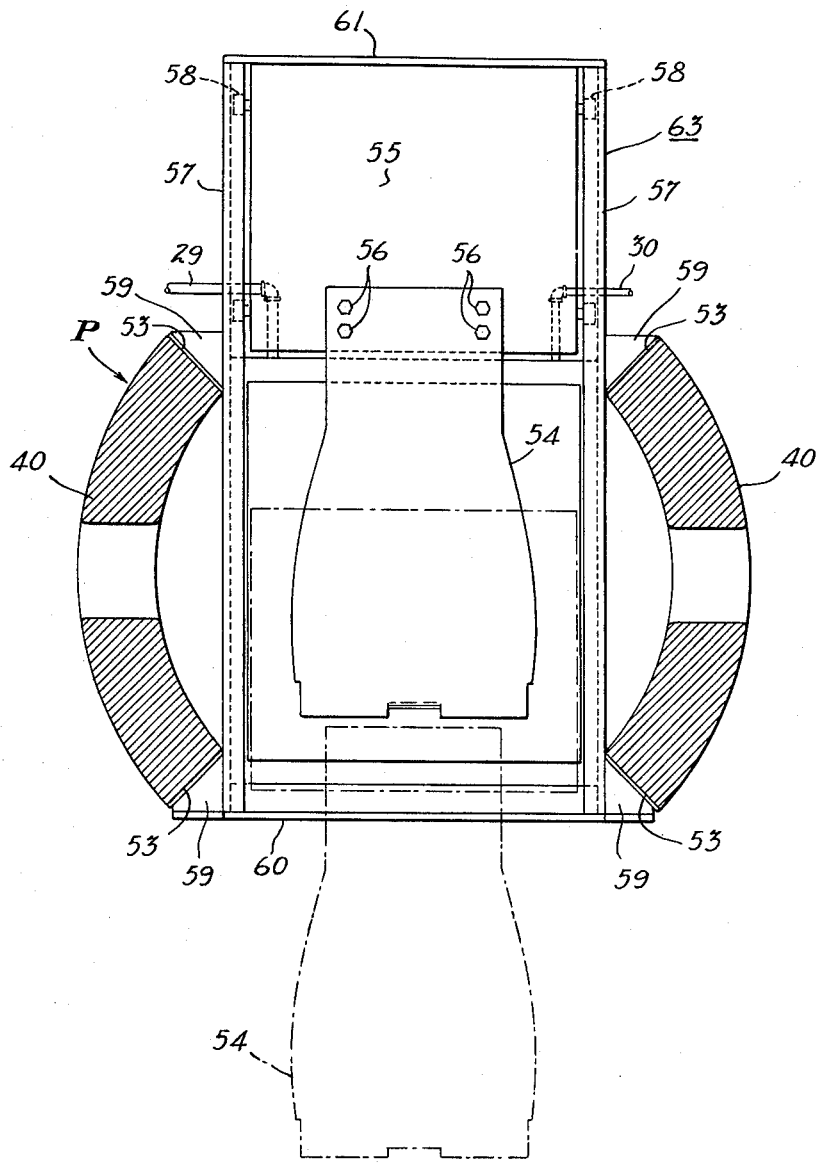
FIGURE 3 is a horizontal sectional view taken on the line 3—3 of FIGURE 1 and on the same scale with parts being omitted, the core member being shown in solid lines in its normal molding position and being shown in dot-dash lines in its advanced stripping position.

A core member 54 having horizontal upper and lower faces is positioned between the top and bottom platens and is rigidly connected at one end to a horizontal carriage 55 by a series of bolts 56 so as to be supported in cantilever fashion. A pair of parallel horizontal guide channels 57 are provided for receiving the cylindrical rollers 58 of the carriage and for guiding the carriage horizontally, the recesses in the channels facing each other as indicated in FIG. 2. Four triangular guide portions 59 are welded to the channels 57 and slidably engage the inclined vertical faces 53 of the standards 40 so as to guide the frame 63 vertically and to prevent movement of said frame out of a horizontal position. The frame 63 comprises the channels 57, a flat connecting member 60 welded to the channels and to the portions 59 at one end of the frame, and a horizontal bar 61 welded to the ends of the channels at the opposite end of the frame 63, as best shown in FIG. 3.

Four metal stops 62 are rigidly connected to the standards 40 at the same elevation and engage the bottom of the frame 63 at the four corners of the frame so as to support said frame in a horizontal position midway between the upper and lower platens as indicated in FIG. 1 when the ram is in its lower position. When hydraulic fluid under pressure is admitted to the hydraulic motor (not shown) that actuates the ram, the ram moves upwardly and the flat surface 72 of the bottom mold section 45 engages the flat bottom surface of the core member 54 to locate the frame 63 accurately in a horizontal position as the frame is lifted off the stops 62, the flat upper marginal surface 74 of the bottom platen 42 being held out of engagement with the channels 57. As the ram continues its upward movement, the frame 63 moves upwardly in unison with the ram.

Figure 4:
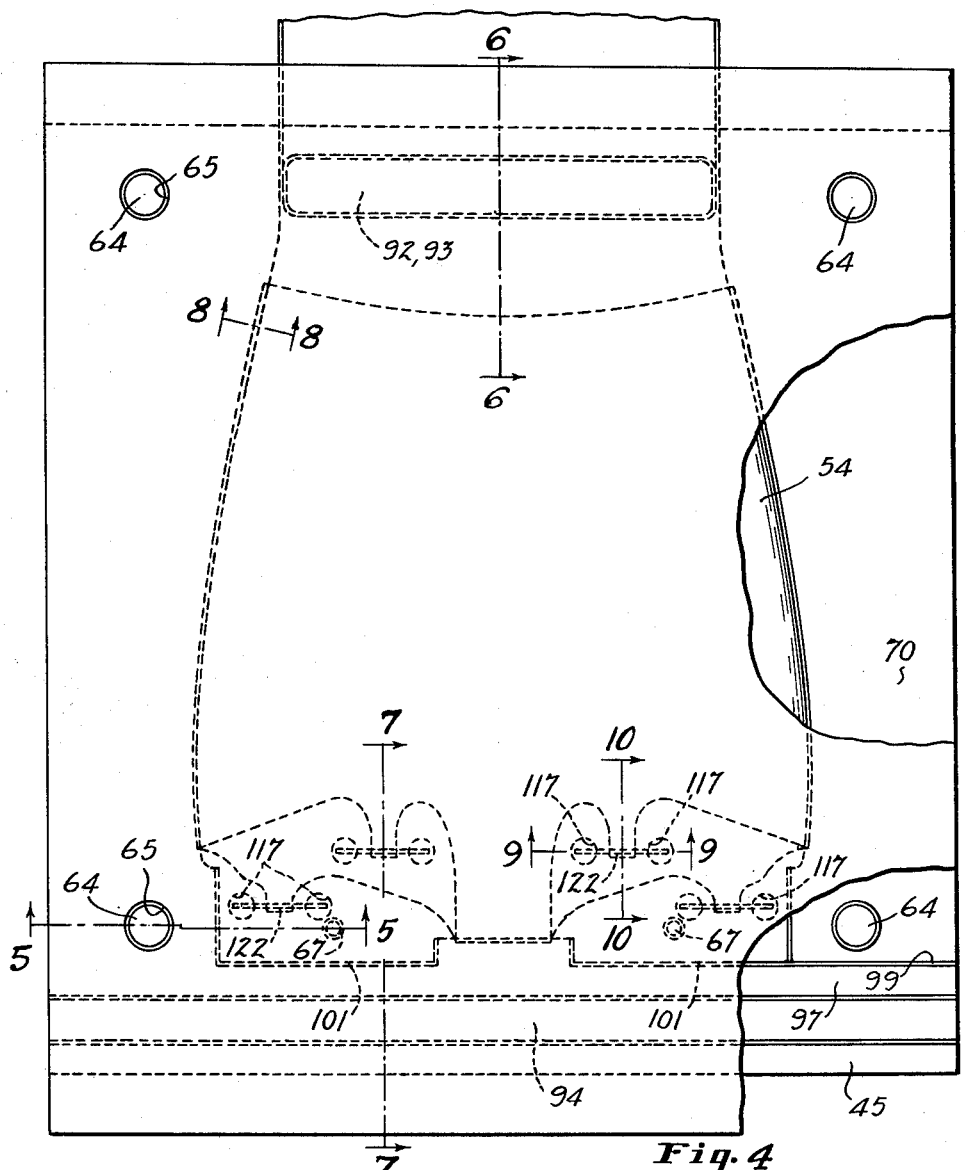
FIGURE 4 is a top plan view of the mold with parts omitted and with parts broken away as viewed on the line 4—4 of FIGURE 2 and on a larger scale.
Figure 5:
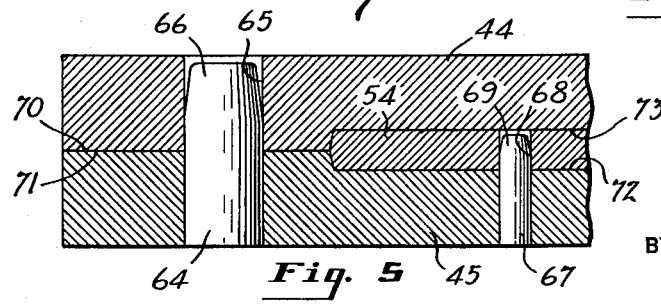
FIGURE 5 is a fragmentary vertical sectional view taken on the line 5—5 of FIGURE 4 and on a larger scale.

Means are provided for guiding the core member 54 into the recess at 72 and for guiding the top and bottom mold sections together as indicated in FIG. 5, so that the various parts will fit together with very small tolerances. Four large dowels 64 are rigidly mounted in the bottom mold section 45 at the four corners thereof as indicated in FIGS. 4 and 5. These dowels have an external diameter corresponding substantially to the internal diameter of the four cylindrical holes 65 which are provided in the top mold section 44 in accurate axial alignment with said dowels. The upper end portions 66 of the dowels are tapered silghtly to facilitate entry into the holes 65 as indicated in FIG. 5 which is drawn substantially to scale. A plurality of smaller dowels 67 are rigidly mounted in the bottom section 45 in axial alignment with the cylindrical holes 68 of the core member 54, said dowels having a diameter corresponding to that of said holes. The upper end portion 69 of each dowel 67 is tapered slightly like the portion 66 previously described.

The top and bottom mold sections 44 and 45 are provided with vertically aligned recesses of a size to receive upper and lower guide bars 92 and 93, said recesses and bars having a uniform cross section throughout their length as indicated in FIG. 6 which is drawn substantially to scale. The bars 92 and 93 are tapered as indicated in the drawings and are rigidly mounted on the core member 54 so that they move into, and out of, the co-operating recesses of the mold sections 44 and 45. The tapered surfaces of these bars facilitate guiding of the core member into the proper position relative to the top and bottom mold sections.

Further means are provided at the end of the core member for positioning the core member accurately including a long accurately machined bar 94 which is rigidly connected to the upper mold section 44 and which has a lower tapered portion 95 which fits accurately into a correspondingly shaped recess in the bottom mold section 45. The tapered portion 95 has a flat tapered surface 96 which engages a similar tapered surface on the transverse bar 97 which is rigidly connected to the bottom mold section 45. A bar 98 aligned with and above the bar 97 is rigidly connected to the mold section 44 and the bar 94 so as to remain at all times in a fixed position while the bottom mold section 45 and its bar 97 move vertically. The flat tapered surface of the bar 97 and the flat tapered surface of the bar 98 fit accurately against the similarly tapered surfaces of the end portion 101 of the core member 54 so as to position said end portion accurately relative to the top and bottom mold sections.

In the manufacture of a girdle, a sheet of rubber is placed on top of the core member 54 and a similar sheet of rubber is placed on the surface 72 of the mold section 45 while parts are in the position shown in FIG. 1. The total volume of the rubber sheets is predetermined so as to correspond substantially to the volume of the finished girdle whereby there is a very slight excess of rubber which may be pinched off by projecting portions of the mold sections. After the sheets have been positioned as indicated above, the fluid is admitted to the hydraulic motors to move the ram 47 upwardly to the position indicated in FIG. 2. As the bottom mold section 45 approaches the core member 54, the bar 93 enters the cooperating recess in the bottom mold section and the tapered surface 99 of the bar 97 engages the cooperating surface of the core member 54 to locate the core member accurately in a predetermined position relative to the bottom mold section.

As the bottom mold section 45 moves into engagement with the top mold section 44 the tapered surface 96 of the bar 95 and the tapered surface 100 of the bar 98 engage tapered surfaces of the bar 97 and the core member 54, respectively, and the bar 92 fits in the recess of the top mold section 44 to locate said mold section accurately relative to the core member 54 and the bottom mold section 45. The bars 92, 93, 94, 97 and 98 provide the accuracy needed for maintaining the desired wall thickness in the finished rubber girdle.

The shape of the elements 44, 45 and 54 will be apparent from FIGS. 4 to 10 which are drawn substantially to scale. It will be noted that the core-receiving cavity in the member 44 has a flat horizontal surface 73 parallel to the flat surface 74 of the mold section 45 and spaced therefrom a distance corresponding to the thickness of the core member 54 at the instant surfaces 70 and 71 are in engagement. At this instant the flat surface 75 of the mold cavity in the member 44 and the flat surface 76 of the mold cavity in the member 45 are parallel to the surfaces 72 and 73 and are spaced from the core member 54 a distance corresponding to the desired wall thickness of the main wall 29 of the girdle. The members 44 and 45 have recesses 103 and 14, respectively, which form the hip reinforcements 23 of the girdle as indicated in FIG. 8. Four recesses 106 are provided in the core member 54 for forming the garter tabs of the girdle. As herein shown, the mold cavity is located mainly between the flat upper and lower surfaces 114 and 115 of the core member and the shaped surfaces of the mold sections 44 and 45 whereby it is relatively easy to slide the finished girdle off of the core member at the completion of the molding operation. It will be understood that the members 44, 45 and 54 will be shaped to provide a mold cavity having a shape corresponding to the desired shape of the girdle A shown in FIGS. 1 to 11 of said Patent No. 3,075,532.

The mold sections 44 and 45 are shaped at the margin of the mold cavity so as to pinch off the excess rubber neatly throughout the periphery of the mold cavity whereby trimming of fins from the girdle is unnecessary. Two radially spaced parallel excess passages extend throughout the length of the margins of the leg- and body-receiving openings of the girdle and throughout the length of the parting surfaces at the sides of the girdle as will be apparent from an inspection of FIGS. 4 and 6 to 10. An excess passage at the parting surface (70–71) is formed by vertically aligned grooves 108 in the mold sections 44 and 45 at each side of the girdle in the manner indicated in FIG. 8. A similar excess passage of circular cross section is formed by the vertically aligned grooves 109 in the mold sections 44 and 45. These two excess passages extend along the side of the girdle from the top to the bottom edge thereof. Similar excess passages extend throughout the length of the top marginal edge of the girdle and throughout the length of the margins of the leg-receiving openings. The latter excess passages are defined by grooves 108a and 109a in the mold section 44 and similar grooves 108b and 109b in the mold section 45.

The mold sections 44 and 45 have projecting portions 110 and 111 between the grooves 108 and 109 which portions have flat surfaces parallel to the surfaces 70 and 71 which move substantially into engagement when the mold is closed as indicated in FIG. 8. The mold sections also have projecting cutoff portions 112 and 113 forming the radially inner sides of the grooves 108 which extend the full length of such grooves and which have cutting surfaces in the plane of the surfaces 70 and 71 which move into engagement when the mold sections move together as indicated in FIG. 8 to pinch off the excess material at the surface of the girdle from the top edge to the bottom edge thereof whereby a ridge is formed at the sides of the girdle which is so small as to be hardly noticeable.

The mold section 44 has projecting portions 110a and 112a similar to the portions 110 and 112, and the mold section 45 has projecting portions 111a and 113a similar to the projecting portions 111 and 113 as indicated in FIG. 10. The portions 110a and 112a have surfaces which may be positioned substantially in the plane of the surface 73 of the member 44, and the portions 111a and 113a have surfaces which may be positioned substantially in the plane of the surface 72 of the mold section 45. The projecting portions 110a and 112a move substantially into engagement with the flat upper surface 114 of the core member 54, and the projecting portions 111a and 113a move substantially into engagement with the flat bottom surface 115 of the core member which is parallel to the surfaces 114, 72 and 73.

When full pressure is applied to the ram and the parts are in the positions indicated in FIG. 10, the clearance between each of the two projecting portions 112a and 113a and the core member is about zero to 0.001 inch and preferably less than 0.0005 inch, and the clearance between each of the projecting portions 110a and 111a and the core member is preferably 0.001 to 0.002 inch. The latter clearance is preferably 0.0005 to 0.002 inch greater than the first-mentioned clearance. The cutoff portions 112, 113, 112a and 113a are tapered in cross section as indicated in FIGS. 8 and 10 so as to pinch off the rubber in the most effective manner while retaining the required strength and wear resistance. The portions 112 and 113 form the ridges at the sides and the crotch of the girdle and the portions 112a and 113a form the ridges at the margins of the waist and leg-receiving openings.

The aparatus of the present invention forms the ridges with a high degree of accuracy so that each of these ridges has a uniform pointed cross section throughout its length and serves to reinforce the girdle. Said cut off portions are preferably shaped so that the height of each ridge is less than 5 percent of the average thickness of the main wall whereby the ridge is hardly noticeable. Such ridge may easily be buffed off but this increases the cost of manufacture and increases the likelihood of weakening the girdle wall or tearing the rubber. Ridges of uniform cross section as formed by the molding apparatus of the present invention cannot be produced by any other practical method. The trimming of fins from a molded rubber article produces scissors cuts and sharp edges which tend to start tears in the rubber and the ridges produced do not have a uniform cross section. Tearing of fins from a molded rubber article is very undesirable because it produces jagged edges at which tears will start. The ridges produced by these prior art methods do not reinforce the girdle but provide points of weakness.

The provision of two parallel excess passages instead of one controls flow of the rubber and greatly facilitates elimination of unsightly fins at the margins of the girdle so as to eliminate the cost of trimming the girdle. The apparatus of the present invention trims the garment effectively during the molding operation to accomplish a result which has not previously been obtainable by those skilled in the art.

The core member 54 is provided with eight cylindrical recesses 117 which receive eight cylindrical bronze cups 118 of the same diameter. These cups have cylindrical recesses therein which receive eight cylindrical permanent magnets 119, each recess 117 being located on one side of a recess 106 in alignment with another recess 117 in the corresponding position on the opposite side of the recess 106 as indicated in FIG. 9. A recess 120 is provided in the mold section 44 directly above the recess 106 to form a portion of the garter tab. The steel insert 122 is placed within the flexible braided tube 21 and positioned in the opening formed by the recesses 120 and 106 as indicated in FIG. 9, the insert being relatively flat so that the outer ends thereof will lay flat on the magnets 119, whereby the insert is accurately positioned. After the completion of the molding operation the inserts 122 may be readily removed from the magnets and slid out of the braided tubes 21 which are then bonded to the rubber. The tube 21 is sufficiently flexible to permit sliding an insert 122 therethrough even though the insert has bends therein.

In the manufacture of girdles according to the present invention, the core member 54 is placed substantially in vertical alignment with the mold cavities of the top and bottom mold sections 44 and 45 as indicated in solid lines in FIGS. 1 and 3. Sheets of rubber having a total volume very slightly greater than the volume of the girdle being manufactured and no greater than the latter volume plus the volume of the first excess passages 108, 108a and 108b, are placed on the upper surfaces of the core member 54 and the bottom mold section 45. The valves controlling the application of hydraulic pressure are then moved so as to admit hydraulic fluid to the ram 47 so as to elevate the ram. As the ram moves upwardly the guide bars 93 and 97 position the core member 54 relative to the mold section 45 and the core member is lifted by the ram so as to cause the frame 63 to move upwardly between the standards 40. As the parts approach the position shown in FIG. 2 the guide bars 92 and 94 are effective to guide the core member and the bottom mold section into the proper position relative to the upper mold section 44.

As the pressure builds up between the core member and the top and bottom mold sections, the rubber of the sheets, which are then in engagement with the surfaces 75 and 76, flows so as to fill all the cavities of the mold including the recesses 106 and 120 surrounding the braided cloth tubes 21. Extremely high pressures of 2000 to 4000 pounds per square inch are employed to obtain the proper flow of rubber and to insure that the rubber is homogeneous and has uniform chemical and physical properties througout the girdle. The upper and lower platens 41 and 42 are heated so as to heat the rubber to the proper vulcanizing temperature during the molding operation. The press is held in the closed position as indicated in FIGS. 2 and 4 to 10 for a predetermined period of time sufficient to cure the rubber to the elastic state. It will be understood, of course, that the girdle may be cured in the mold and then given a final cure outside the mold after the flocking operation.

After the molding operaiton is completed, the application of hydraulic pressure is discontinued and the ram 47 is allowed to drop so as to permit the frame 63 to move away from the upper platen. The weight of the frame 63 and the parts carried thereby is sufficient to separate the rubber of the girdle from the surfaces of the upper mold section. As the ram moves downwardly the frame 63 moves into engagement with the stops 62 which terminate such downward movement and support the frame in a horizontal position. The continued downward movement of the ram separates the bottom mold section from the girdle. The carriage 55 is then moved horizontally from its normal operating position shown in solid lines in FIG. 3 to a stripping position as shown in dot-dash lines in FIG. 3, the rollers 58 facilitating such movement. The plate 60 limits the horizontal movement of such roller so as to prevent separation of said carriage from the frame 63.

When the carriage is in said stripping position, the core member 54 projects outwardly from the press where it is readily accessible to the operator. The operator then removes the metal insert 122 from each of the braided tubes 21 and removes the garter tabs from the recesses 106. The girdle may then be stretched slightly so as to remove the girdle from the core member 54. The resulting girdle is substantially free of fins or the like and need not be trimmed. The outer surface of the girdle has configuration which accurately duplicate the design on the mold surfaces, the high pressure applied during molding providing perfect designs. Since the girdle is molded inside out the inner surface thereof faces outwardly.

After one girdle is removed from the core member 54, four new braided tubes 21 are provided and an insert 122 is inserted into each braided tube. Each insert is then positioned on a pair of magnets 119 so as to support the braided tube in the recess 106 as indicated, for example, in FIG. 9. The four braided tubes are mounted in this manner on the core member 54 before the core member is returned to its position in alignment with the mold recesses as shown in solid lines in FIG. 3. Thereafter the rubber sheets are mounted on the core member and in the bottom mold recess as described previously and the cycle is reepated to complete another girdle.

The apparatus of the present invention is able to operate under extremely high pressure and trims the article much more effectively because of the fact that the core member 54 is flat and substantially free of deep grooves such as those provided to form the reinforcing areas of the girdle. This flat construction greatly improves the accuracy in the molding operation and permits the formation of extremely small designs on the outside surface of the girdle. Applicant has discovered a novel method of producing accurately fine designs on a flat surface which method uses acid to etch the flat surface. By making the opposite faces of the core member 54 generally flat and parallel, it is possible to employ this process and to thereby produce very beautiful designs which could not possibly be provided on mass-produced rubber girdles by any of the methods known prior to this invention. Because of the invention, it is practical, for example, to produce a girdle having an outside surface with the shape corresponding almost exactly to that of a woven cloth garment having a design sewed thereon. Each thread in the design can be reproduced in every garment with amazing accuracy. Because of the ability to produce fine designs, the tendency of the girdle to collect and show dirt can be minimized so that rubber girdles are acceptable to a larger percentage of the population.

The flat construction employed in the molding apparatus of this invention in combination with the other features of the apparatus, permits the making of very thin rubber articles having a quality which is unexpectedly high for molded articles and a cost which is unexpectedly low. Such construction also permits molding and curing at extremely high pressures which produce the highest quality cured rubber. Because of the unusual advantages of the invention, the molded rubber girdle promises to replace the deposited latex girdle. Because of the many advantages of the invention and the failure of others to produce the invention, it becomes apparent that the invention would not and did not occur to those skilled in the art in spite of its simplicity as viewed by hindsight.

The molded girdle has many unexpected advantages. The cured masticated rubber compound, which contains reinforcing fillers in addition to the curing agents and other ingredients, does not stretch as freely as cured latex rubber under low tension and therefore is better able to shape the body in the desired manner. The molded girdle is found to have many other advantages over deposited latex girdles, the curing under extremely high pressure imparts ideal physical properties to the rubber which are uniform throughout the entire garment.

The masticated rubber composition used to make girdles according to the present invention may be made in various ways to provide high tensile strength and other desired properties, and it will be understood that the following description is by way of illustration rather than limitation. Such composition usually contaiins 100 parts by weight of natural, GR–S or other synthetic rubber (preferably natural rubber) and 15 to 80 parts by weight of fillers including finely divided or colloidal reinforcing materials such as silica or calcium silicate.

The composition usually contains vulcanizing agents, accelerators, coloring agents, antioxidants and other conventional compounding ingredients to provide a rubber product which can be worn next to the human skin. The composition is preferably substantially free of carbon black and may include materials which reduce the odor or provide a pleasing odor. Dusting agents or mold lubricants may be used to facilitate molding of the garment and small amounts of plasticizers may be used if necessary to improve the flowability of the rubber.

The masticated rubber compositions for use in making rubber girdles preferably contain 10 to 50% by weight of nonblack reinforcing fillers which produce high tensile strengths, such as finely divided silica, finely divided calcium silicate or the like. Suitable fillers include "Hi-Sil 101" (hydrated silica having an average particle size of about 0.025 micron), "Silene EF" (hydrated calcium silicate having an average particle size of about 0.030 micron) and "Hi-Sil 233" (hydrated silica having an average particle size of about 0.022 micron).

*Example I*

A masticated natural rubber compound is prepared as follows:

| | Parts by weight |
|---|---|
| Natural rubber (pale crepe) | 100 |
| Zinc oxide | 5 |
| Titanium dioxide | 10 |
| Hi-Sil 233 | 25 |
| Sulfur | 1.0 |
| Accelerator (benzothiazyl disulfide) | 1.5 |
| Accelerator (zinc dimethyl dithiocarbamate) | 0.4 |
| Stearic acid | 1.0 |
| Rosin oil | 1.0 |
| Antioxidant (heptylated diphenylamine) | 0.8 |

The materials are thoroughly mixed in a Banbury mixer and the resulting rubber composition is rolled into sheets and cut into pieces of suitable size for making a pantie girdle on apparatus of the type shown in FIGS. 1 to 10. Such pieces are then placed in such apparatus, and a girdle A as shown in FIGS. 1 to 11 of said Patent No. 3,075,532 is molded and cured according to the method previously described. The resulting girdle has tear resistance, oxidation resistance, tensile strength, and other properties which are excellent for this type of garment.

It will be understood that percentages and "parts" refer to amounts by weight wherever they appear in the specification or claim with respect to rubber compositions.

It will be understood that the above description is by way of illustration rather than limitation and that, in accordance with the provisions of the patent statutes, variations and modifications of the specific articles and methods disclosed herein may be made without departing from the spirit of the invention.

Having described my invention, I claim:

Apparatus for simultaneously molding and curing a curable masticated rubber compound under a pressure of at least 1000 pounds per square inch to form a one-piece elastic rubber pantie girdle comprising: upper and lower platens, a generally flat horizontal core member having rounded convex side faces, an upper mold member mounted on the upper platen above said core member, a lower mold member mounted on the lower platen below said core member, said mold members fitting together when the platens are moved together to define a mold recess having a shape corresponding to a one-piece pantie girdle having a waist opening and two leg openings, said waist opening having a circumference of about 18 to 40 inches, said recess extending completely around said core member to form an endless band comprising the front, rear and side wall portions of the girdle and extending around the core member to form a crotch portion joining the front and rear wall portions of the girdle, a first set of excess passages located at and extending throughout the margins of the waist and leg openings, a second set of excess passages parallel to and adjacent the first set, each of the above excess passages being formed between the core member and one of said mold members, the portions of the mold members between the mold recess and the first excess passages being tapered from the mold recess to the first excess passages to provide means for pinching off the rubber throughout the margins of the waist and leg openings and being located to move into engagement at the marginal edge of the mold recess to provide means for pinching off the rubber throughout the margins of the waist and leg openings and being located to move into engagement at the marginal edge of the mold recess during molding of the girdle, the portions of the mold members between the first and the second sets of excess passages being shaped and located to provide a clearance space between said sets of passages during molding, said clearance space extending the full length of the passages and having a height of about 0.0005 to 0.002 inch to resist movement of the rubber from said first set to said second set, whereby the flow of rubber is controlled and said means for pinching off the rubber applies pressure uniformly to form minute ridges in the girdle having a uniform cross section throughout their lengths when said rubber compound is pressed against said core member with a pressure of at least 1000 pounds per square inch, said first set of excess passages including straight excess passages formed between the upper and lower mold members at the opposite sides of the girdle and at the crotch portion of the girdle, the second set of excess passages including straight excess passages formed between the upper and lower mold members parallel to and adjacent said first-named straight passages, the portions of the mold members between said first-named straight passages and said mold recess being tapered to pinch off the rubber at the sides and the crotch of the pantie girdle during molding and the portions of the mold members between said first- and last-named straight passages being shaped and located during molding to provide a small clearance space between the mold members having a height of about 0.0005 to 0.002 inch.

References Cited by the Examiner

UNITED STATES PATENTS

| | | | |
|---|---|---|---|
| 1,195,412 | 8/16 | Stimson | 18—45 |
| 1,314,344 | 8/19 | Mahoney | 18—35 |
| 1,442,357 | 1/23 | Patterson | 264—248 |
| 1,570,128 | 1/26 | Carter | 264—248 |
| 1,977,801 | 10/34 | Mazoyer | 25—35 |
| 2,195,424 | 4/40 | Raiche | 264—163 |
| 2,235,981 | 3/41 | Coe et al. | 264—163 |
| 2,627,641 | 2/53 | Steele et al. | 264—319 |
| 2,674,559 | 4/54 | Zobel | 156—66 |
| 2,684,320 | 7/54 | Lyijynen | 156—66 |
| 2,708,271 | 5/55 | Steinberg | 128—521 |
| 2,955,597 | 10/60 | Dorsey | 128—521 |
| 3,036,339 | 5/62 | Bowerman | 18—47.5 |
| 3,081,495 | 3/63 | Kovatch | 18—47.5 |

ALEXANDER H. BRODMERKEL, *Primary Examiner.*